C. J. WESTMAN.
BALL RETAINER FOR BALL BEARINGS.
APPLICATION FILED APR. 9, 1918.
1,321,687.
Patented Nov. 11, 1919.
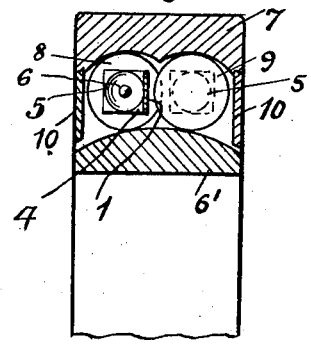
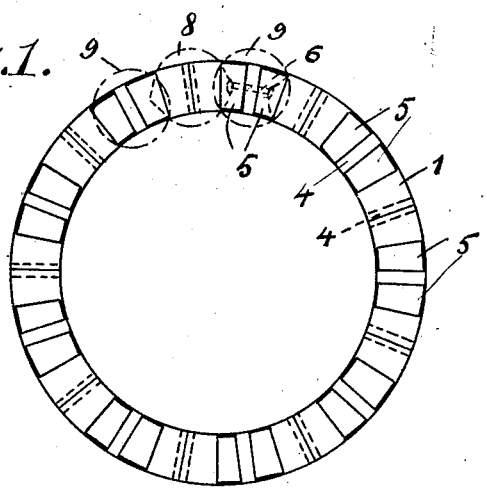
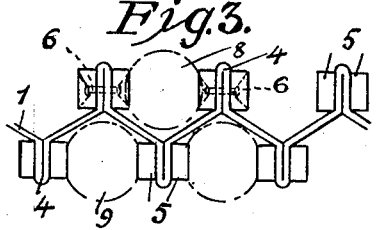
INVENTOR:
C. J. WESTMAN
BY
ATTORNEY.

UNITED STATES PATENT OFFICE.

CARL JOHAN WESTMAN, OF STOCKHOLM, SWEDEN, ASSIGNOR TO AKTIEBOLAGET ZEUS, OF STOCKHOLM, SWEDEN, A CORPORATION OF SWEDEN.

BALL-RETAINER FOR BALL-BEARINGS.

1,321,687.     Specification of Letters Patent.    Patented Nov. 11, 1919.

Application filed April 9, 1918. Serial No. 227,582.

*To all whom it may concern:*

Be it known that I, CARL JOHAN WESTMAN, a subject of the King of Sweden, and resident of Handtverkaregatan 43ᴬ, Stockholm, in the Kingdom of Sweden, have invented certain new and useful Improvements in Ball-Retainers for Ball-Bearings, of which the following is a specification, reference being had therein to the accompanying drawing.

This invention relates to a ball-retainer for ball-bearings especially for bearings provided with two rows of balls. The said ball-retainer consists of tube pieces or tube shaped pieces fixed to a band, which is bent in such manner, that, when the retainer is located in the bearing, the balls centrally engage the ends of the said pieces respectively and thus are sustained axially as well as radially in every direction.

Figure 1 in the accompanying drawing is a side view of a ball-retainer arranged in accordance with this invention and adapted for use with a bearing provided with two rows of balls; a few balls are shown by dotted lines. Fig. 2 is a longitudinal section of a bearing provided with two rows of balls and with a ball-retainer arranged in accordance with this invention. Fig. 3 is an edge view of part of a ball retainer adapted for a bearing provided with two rows of balls, the ball retainer, for the purpose of better illustration being straightened out; the balls located in the retainer are shown by dotted lines.

The ball-retainer consists of a band 1, which is bent edgewise into the shape of a ring, adapted to the width of the bearing, and laterally into a zigzag shape, so that it may embrace partially and with the necessary play the balls of the rows.

The corners are flattened, as shown most clearly in Fig. 3. The flattened parts 4 of the ring extend axially of the retainer and on both sides of each flattened part tube pieces or tube shaped pieces 5 are fixed for instance by means of a rivet 6 threaded through the tube shaped pieces 5, 5 and a hole provided in the branches of the flattened part 4. The length of the tube pieces or the distance between the same is so adapted, that the balls 8, 9 when being mounted into the retainer, must be forced into the spaces between the respective tube pieces, so that the balls, when located in their places, extend partially and with the necessary play into the ends of the tube pieces. Preferably, the edges of the ends of the tube shaped pieces are beveled inside, in order that the ends may fit more closely to the balls and the balls may run more easily against the tube shaped pieces.

In the retainers thus arranged the balls are sustained properly in all directions. Owing to the yielding capacity of the band the balls can easily be mounted into the retainer. As seen from Fig. 3 the rows of the balls are located very closely to one another, in consequence whereof the bearing may be made very narrow, as shown in Fig. 2. In the said figure 6 is the inner ring of the bearing and 7 its outer ring. 8 and 9 designate two balls. 10, 10 are ring shaped dust shields.

Having now described my invention, what I claim as new and desire to secure by Letters Patent is:

In a ball-retainer for ball-bearings provided with two rows of balls, the combination of a band shaped ring placed edgewise and bent into a zigzag shape, the corners being flattened, tube shaped pieces located on opposite sides of the flattened parts and adapted to embrace the balls of the bearing, and rivets connecting the said tube shaped pieces with the said flattened parts, substantially as described and shown in the accompanying drawing.

In witness whereof I have hereunto signed my name.

CARL JOHAN WESTMAN.